United States Patent
Werner et al.

(10) Patent No.: US 11,082,232 B2
(45) Date of Patent: Aug. 3, 2021

(54) AUDITABLY PROVING A USAGE HISTORY OF AN ASSET

(71) Applicant: INTERNATIONAL BUSINESS MACHINES CORPORATION, Armonk, NY (US)

(72) Inventors: Klaus Werner, Moetzingen (DE); Jakob C. Lang, Tuebingen (DE); Joerg Schmidbauer, Boeblingen (DE); Angel Nunez Mencias, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 16/450,127

(22) Filed: Jun. 24, 2019

(65) Prior Publication Data
US 2020/0403803 A1    Dec. 24, 2020

(51) Int. Cl.
*H04L 9/32* (2006.01)
*H04L 9/14* (2006.01)

(52) U.S. Cl.
CPC .............. *H04L 9/3242* (2013.01); *H04L 9/14* (2013.01); *H04L 9/3247* (2013.01)

(58) Field of Classification Search
CPC ........ H04L 9/3242; H04L 9/14; H04L 9/3247
See application file for complete search history.

(56) References Cited

U.S. PATENT DOCUMENTS

| | | | | |
|---|---|---|---|---|
| 6,363,488 | B1* | 3/2002 | Ginter | G06F 21/33 726/1 |
| 7,095,854 | B1* | 8/2006 | Ginter | G06F 21/10 380/231 |
| 7,181,560 | B1* | 2/2007 | Grand | G06F 1/206 710/300 |
| 7,617,251 | B2* | 11/2009 | Blumenau | G06F 21/10 |
| 2002/0199094 | A1* | 12/2002 | Strand | B01J 19/0093 713/150 |
| 2004/0133653 | A1* | 7/2004 | Defosse | G06Q 20/32 709/217 |
| 2007/0136817 | A1* | 6/2007 | Nguyen | H04L 9/3213 726/26 |
| 2009/0164522 | A1* | 6/2009 | Fahey | H04L 63/30 |
| 2010/0188975 | A1* | 7/2010 | Raleigh | G06Q 40/12 370/230.1 |

(Continued)

OTHER PUBLICATIONS

"Augmented chain of ownership: configuring IoT devices with the help of the blockchain", Oct. 15, 2018, 17 pages. (Year: 2018).*

(Continued)

*Primary Examiner* — Yonas A Bayou
(74) *Attorney, Agent, or Firm* — Margaret A. McNamara, Esq.; Kevin P. Radigan, Esq.; Heslin Rothenberg Farley & Mesiti P.C.

(57) ABSTRACT

Auditably proving a usage history of an asset, in which the asset includes a hardware security module with at least a public key and a private key. A client application logs hash values of a pair of request data and response data. Usage history of the asset is proved. The proving includes verifying, using the public key, a signature of other hash values of the pair of request data and response data. The other hash values are signed with the private key. The proving further includes comparing the hash values logged by the client application with the other hash values.

20 Claims, 4 Drawing Sheets

(56) References Cited

U.S. PATENT DOCUMENTS

| | | | |
|---|---|---|---|
| 2011/0113122 A1* | 5/2011 | Drope | H04N 21/41407 |
| | | | 709/219 |
| 2012/0214441 A1* | 8/2012 | Raleigh | H04L 67/306 |
| | | | 455/406 |
| 2015/0134552 A1* | 5/2015 | Engels | H04L 9/3297 |
| | | | 705/318 |
| 2017/0046652 A1 | 2/2017 | Haldenby et al. | |
| 2018/0025166 A1 | 1/2018 | Daniel et al. | |
| 2018/0375750 A1* | 12/2018 | Moeller | G06Q 10/0833 |

OTHER PUBLICATIONS

Dramé-Maigné et al., "Augmented Chain of Ownership: Configuring IoT Devices With the Help of the Blockchain," Oct. 15, 2018, pp. 53-68 (+ cover sheet).

* cited by examiner

AUDITABLY PROVING A USAGE HISTORY OF AN ASSET

BACKGROUND

One or more aspects relate in general to data processing systems, and in particular, to auditably proving a usage history of an asset.

A client may require auditable proof of an asset or hardware security module usage and a usage history of these devices for verifying if there are any intrusions to a computer system.

Remote attestation is a technique by which a host (client) authenticates its hardware and software configuration to a remote host (server). A goal of remote attestation is to enable a remote system (challenger) to determine the level of trust in the integrity of the platform of another system (attestator). The architecture for remote attestation includes two components: an integrity measurement architecture and a remote attestation protocol. A remote attestation protocol may be vulnerable to a Man-In-The-Middle attack.

Trusted Computing (TC) is a technology developed by the Trusted Computing Group. The term is taken from the field of trusted systems. With Trusted Computing, the computer will consistently behave in expected ways, and those behaviors will be enforced by computer hardware and software. Enforcing this behavior is achieved by loading the hardware with a unique encryption key inaccessible to the rest of the system.

SUMMARY

Shortcomings of the prior art are overcome and additional advantages are provided through the provision of a computer-implemented method of auditably proving a usage history of an asset. The computer-implemented method includes logging hash values of a pair of request data and response data, and proving the usage history of the asset. The asset includes a hardware security module with at least a public key and a private key. The proving includes verifying a signature of other hash values of the pair of request data and response data. The other hash values are signed with the private key and stored in a secure database. Further, the verifying includes verifying the signature with the public key, and comparing the hash values with the other hash values stored in the secure database.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the present invention together with the above-mentioned and other objects and advantages may best be understood from the following detailed description of the embodiments, but not restricted to the embodiments.

DETAILED DESCRIPTION

Figure 1:
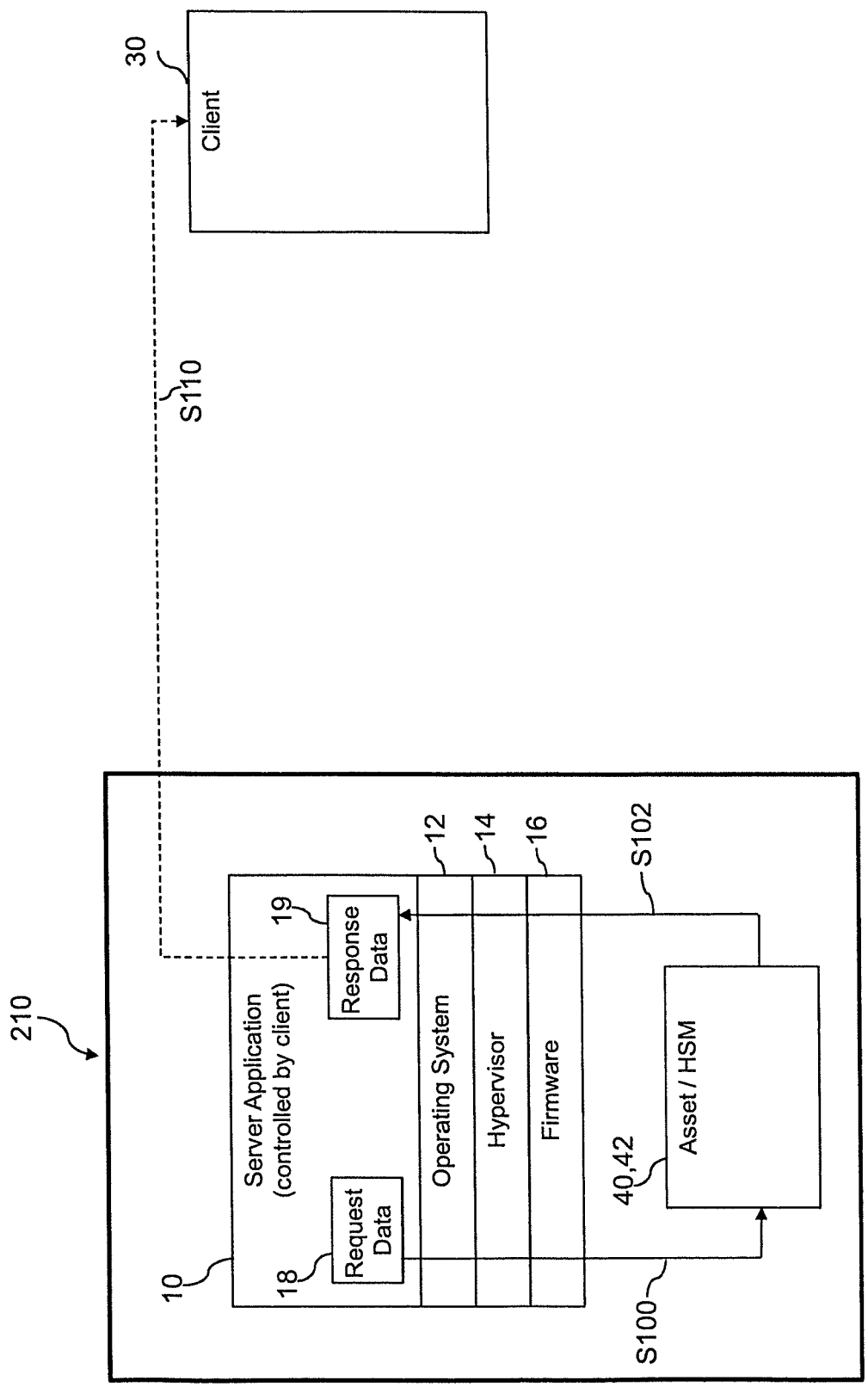
FIG. 1 depicts a data processing system for issuing a request/respond process by a client according to state of the art.

In the drawings, like elements are referred to with equal reference numerals. The drawings are merely schematic representations, not intended to portray specific parameters of aspects of the invention. Moreover, the drawings are intended to depict embodiments of the invention, and therefore, should not be considered as limiting the scope of the invention.

One or more embodiments described herein provide a method for auditably proving a usage history of an asset, wherein the asset includes a hardware security module with at least a public key and at least a private key.

In one or more embodiments, a hardware security module generates hash values of a pair of a request data and a response data. The hash values are signed with the private key and stored in a secure database. A client application logs hash values of the pair of the request data and the response data. The usage history of the asset is proved by verifying the signature of the hash values with the public key and comparing the hash values logged by the client application with the hash values stored in the secure database.

FIG. 1 depicts a data processing system 210 for issuing a request/respond process by a client according to state of the art.

The data processing system 210 includes a server application 10 with firmware 16, a hypervisor 14 and an operating system 12. An asset 40 is integrated in the data processing system 210 and further includes a hardware security module (HSM) 42.

A client application 30 issues a crypto request by the server application 10. The server application 10 is controlled by the client application 30. The client application 30 in FIG. 1 is located outside of the data processing system 210, yet could also be located inside of the data processing system 210.

The request data 18 is sent to the hardware security module 42 with subprocess S100, where the request is processed and response data 19 is sent back with subprocess S102 to the server application 10. Response data 19 is sent to the client application 30 by the subprocess S110. The client application 30 has no possibility to check if the data issued from the hardware security module 42 is modified.

Figure 2:
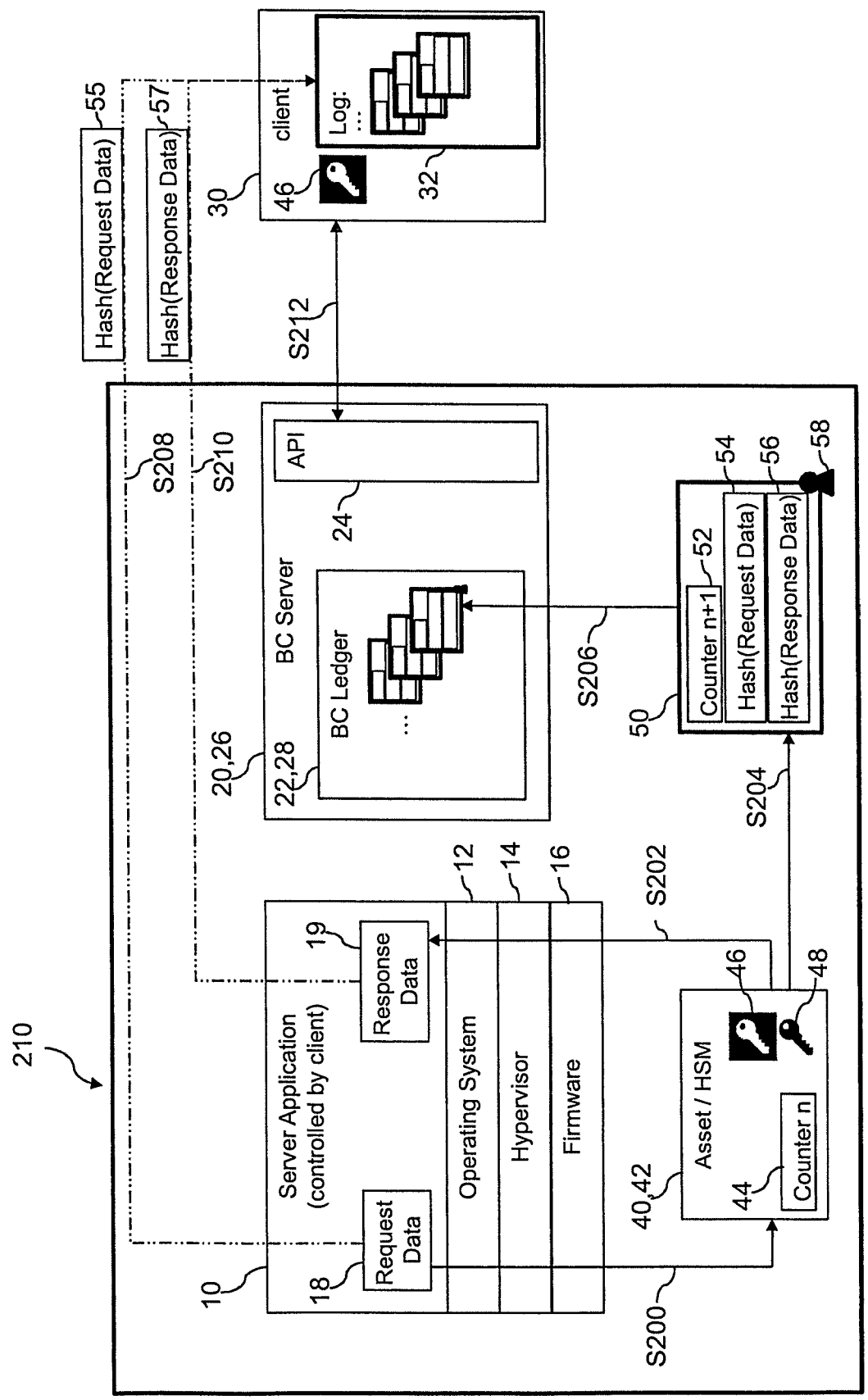
FIG. 2 depicts one example of a data processing system for issuing a request/respond process by a client with auditably proving a usage history of an asset according to an embodiment of the invention.

FIG. 2 depicts one example of a data processing system 210 for issuing a request/respond process by a client with auditably proving a usage history of an asset 40 according to an embodiment of the invention.

The configuration of the data processing system 210 depicted in FIG. 2 is based, for instance, on the configuration shown in FIG. 1. As mentioned before, in another embodiment, the client application 30 may be located inside of the data processing system 210. Additionally, in one example, the data processing system 210 includes a server 20 with a secure database 22 and an application programming interface (API) 24. The asset 40 includes a hardware security module (HSM) 42 with at least a public key 46 and at least a private key 48. Advantageously, the private key 48 may not be accessible during normal asset use.

The process starts again with the client application 30 issuing the crypto request S208 by the server application 10. The server application 10 is controlled by the client application 30.

According to an embodiment of the invention, the hardware security module 42 generates hash values 54, 56 of the pair of the request data 18 and the response data 19. The hash values 54, 56 are signed with the private key 48 and stored in secure database 22 of the server 20. The client application 30 is logging hash values 55, 57 of the pair of the request data 18 and the response data 19, which may be generated by the server application 10 or the client application 30 or by the operating system 12, as well. Then the usage history of the asset 40 may be proven by verifying the signature 58 of the hash values 54, 56 with the public key 46 from the hardware security module 42, available in the client application 30 and comparing the hash values 55, 57 logged by the client application 30 with the hash values 54, 56 stored in the secure database 22.

In response to receiving the request data 18 from the server application 10 by subprocess S200, the hardware security module 42 generates the response data 19. In the hardware security module 42 the hash value 54 of the request data 18 and the hash value 56 of the response data 19 are generated.

The hardware security module 42 sends the response data 19 to the server application 10 by subprocess S202.

The hardware security module 42 further signs the hash values 54, 56 with the private key 48 and sends the hash values 54, 56, signed with the signature 58, together with the signature 58 as a tracking record 50 to the secure database 22 in subprocesses S204, S206.

The server application 10 sends hash values 55, 57, generated by the server application 10 or by the operating system 12, to the client application 30 by subprocess S210. Alternatively, the server application 10 may only send the request data 18 and the response data 19, wherein the hash values 55, 57 may be generated by the client application 30 itself. The client application 30 is logging the hash values 55, 57 of the request data 18 and the response data 19, received by the server application 10. For this purpose, the client application 10 includes a local log file 32, where the hash values 55, 57 received from the server application 10 are stored. This is possible, because the client controls the client application 30.

For auditably proving the usage history of the asset 40, the signed hash values 54, 56 may be retrieved from the secure database 22 by subprocess S212, the signature 58 is validated with the public key 46 from the hardware security module 42 and the hash values 55, 57 logged by the client application 30 are compared with the hash values 54, 56 stored in the secure database 22. The client application 30 may receive the public key 46 from the hardware security module 42 during an initial setup, where the public key 46 may be published. The signed hash values 54, 56 may be retrieved from the secure database 22 by the client application 30. Alternatively, the signed hash values 54, 56 may be retrieved from the secure database 22 by any client application or a third party application or some other service.

For retrieving the signed hash values 54, 56 from the secure database 22, the client application 30 may use an application programming interface 24 on the server 20 comprising the secure database 22.

The hardware security module 42 further comprises a counter 44 and increments a value n of the counter 44 with each new request data 18 by, e.g., one unit, such that the value of the counter 52 in the tracking record 50 amounts to n+1. The incremented value n+1 of the counter 52 is amended or combined together with the signature 58 to the hash values 54, 56 transferred to the secure database 22. Thus, the client application 30 may verify the gapless request processing of the hardware security module 42 by checking a sequence of the counter values 44, 52. Alternatively, the gapless request processing may also be tracked by another service.

A firmware of the hardware security module 42 may advantageously ensure that the signed hash values 54, 56 are correctly transferred to the secure database 22. The signed hash values 54, 56 thus may be stored in the hardware security module 42 until the firmware confirms the transfer to the secure database 22.

The secure database 22 is implemented on the server 20 which is implemented as, for instance, a blockchain server 26 with a blockchain ledger 28. In one example, the secure database 22 is implemented in the blockchain ledger 28, such that the signed hash values 54, 56 are stored in the blockchain ledger 28.

Thus, advantageously, the hardware security module 42 or the client application 30 may generate measurement data of the request data 18 and the response data 19, which measurement data is stored in the log file 32. The hardware security module 42 may add an execution control to the hash values 54, 56 of the request data 18 and the response data 19. For example, extensions like a timestamp information, may be added to the hash values 54, 56 of the request data 18 and the response data 19.

Figure 3:
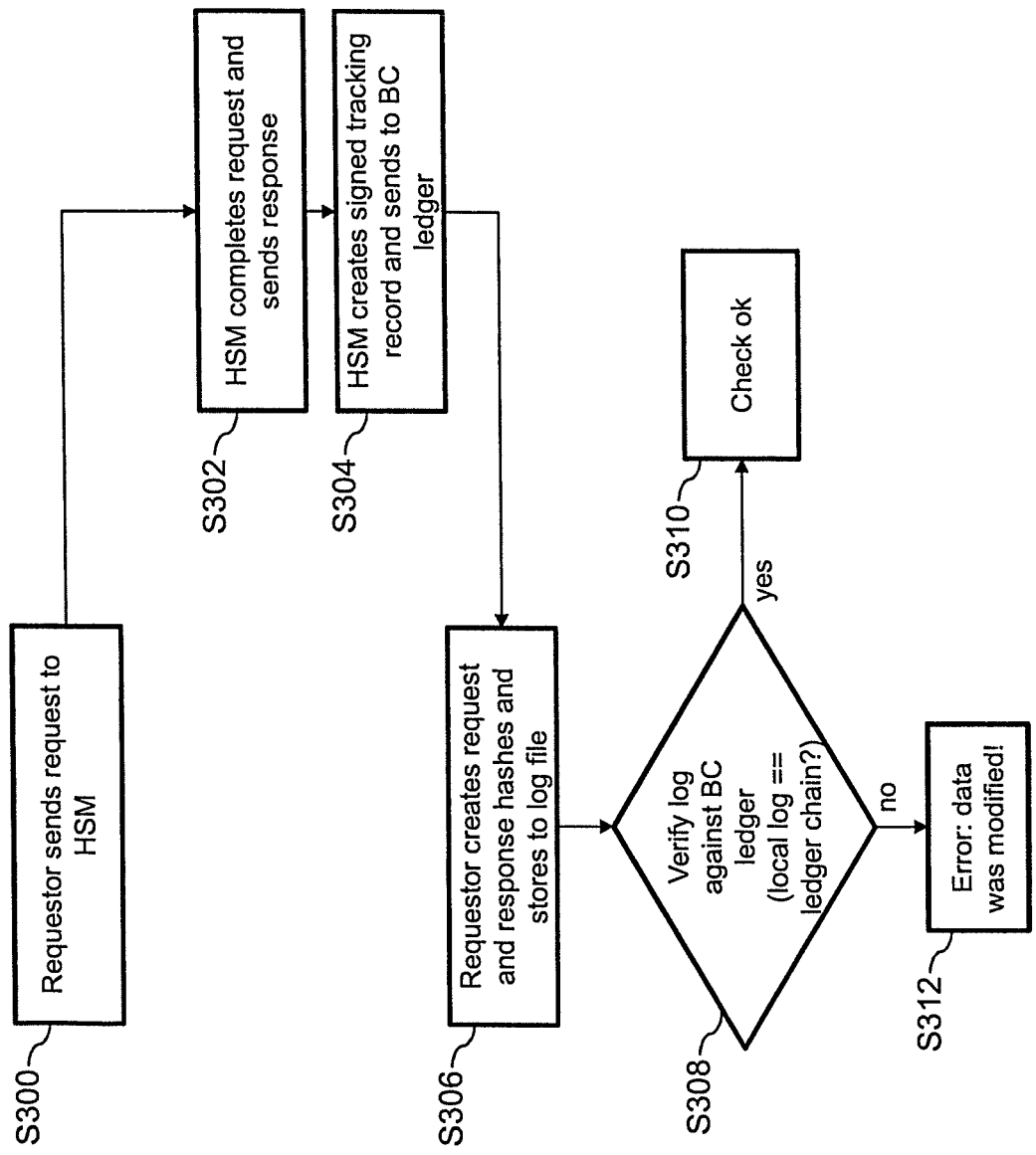
FIG. 3 depicts one example of a flow chart of a request/respond process by a client with auditably proving a usage history of an asset according to an embodiment of the invention.

FIG. 3 depicts one example of a flow chart of the request/respond process by a client with auditably proving a usage history of an asset according to an embodiment of the invention.

A client application may send a request to the hardware security module via a server application as a requestor in step S300. In step S302, the hardware security module completes the request and sends a response to the server application as requestor.

According to an embodiment of the invention, then, in step S304, the hardware security module creates hash values of the request data and the response data and signs them with a private key which is stored together with a public key in the hardware security module. The signed hash values are included together with the signature in a signed tracking record, which is sent to a blockchain ledger as a secure database.

The server application as a requestor may also create hash values of the request data and the response data in step S306. This may be performed by the server application itself or by the operating system. These hash values are sent to the client application and stored in a local log file. Alternatively, the hash values may be created by the client application itself.

Next, in step S308, the hash values from the log file of the client application are verified against the hash values retrieved from the blockchain ledger and decrypted using a public key stored in the client application. The hash values may be retrieved from the blockchain ledger by a client application or by any other service.

If the hash values stored in the log file of the client application match with the hash values decrypted from the values stored in the blockchain ledger, a result of the check in step S308 is positive, step S310, and the data is correct. If the hash values from the log file of the client application do not match with the decrypted values from the blockchain ledger, the result of the check in step S308 is negative, step S312. Conclusion may be that the data may be modified.

Figure 4:
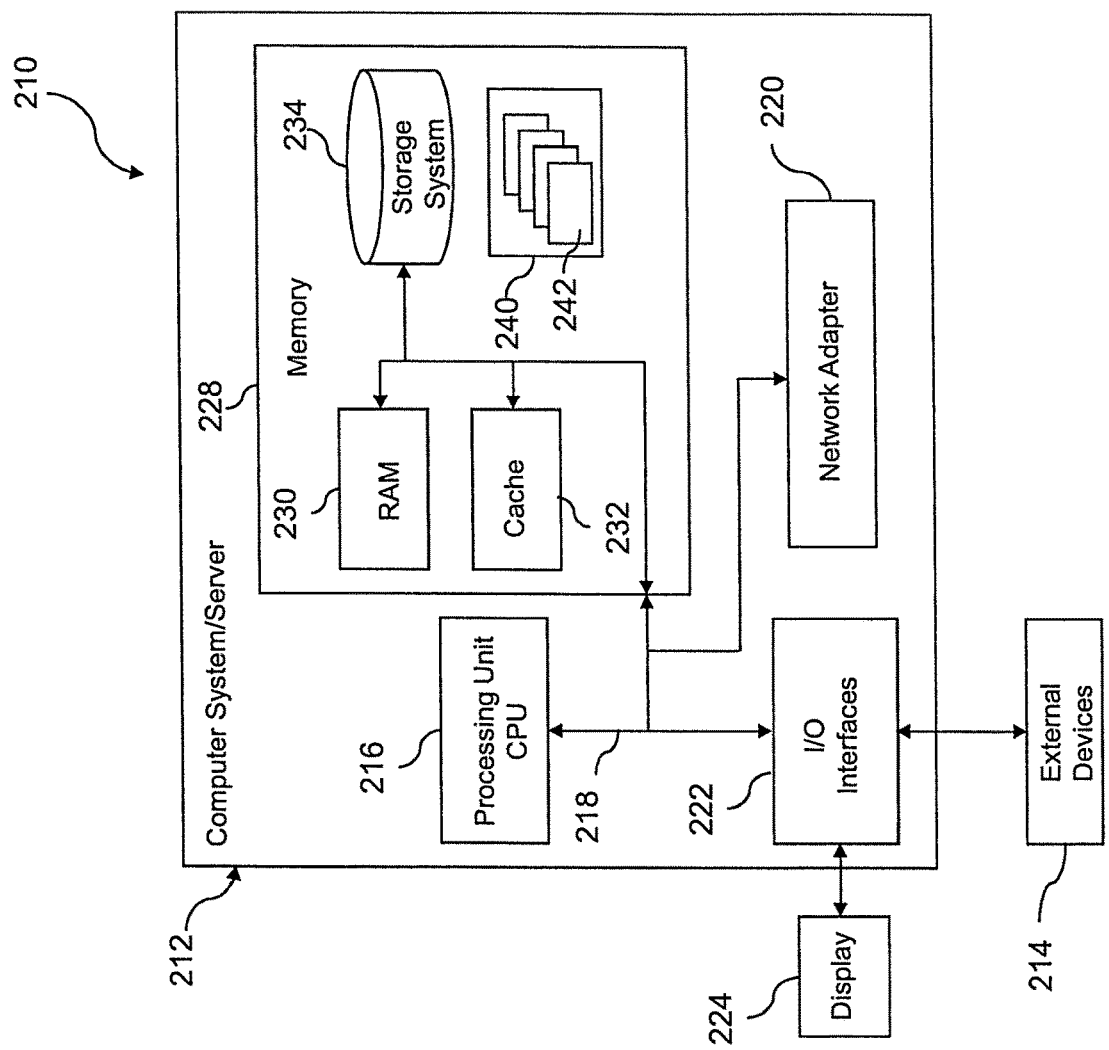
FIG. 4 depicts an example embodiment of a data processing system for executing a method according to one or more aspects of the invention.

Referring now to FIG. 4, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210, there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, in one aspect, a computer implemented method of auditably proving a usage history of an asset is provided. The asset includes a hardware security module with at least a public key and at least a private key. The method includes the hardware security module generating hash values of a pair of a request data and a response data, in which the hash values are signed with the private key and stored in a secure database. A client application logs hash values of the pair of the request data and the response data. The usage history of the asset is proved by verifying the signature of the hash values with the public key and comparing the hash values logged by the client application with the hash values stored in the secure database.

An auditable proof of an asset usage history is provided, where a client can verify the whole usage history of an asset in a secure way. This is achieved by using a Hardware Security Module (HSM) in each asset to create hash values of a request and a response pair, signing it with the HSM owned private key of a public/private key pair, and storing it in a secure database maintained separately from the assets. The private key is not, in one example, accessible during normal asset use. A client application which is logging hash values of the request and response pair can validate and verify that the complete audit log sequence was executed on the respective HSM. In one embodiment, the secure database may be a blockchain ledger. By using an additional counter in the HSM, whose values are amended or combined to the hash values stored in the blockchain ledger, a gapless request processing may be tracked by the client or by any other service.

Further, a computer program product is provided for auditably proving a usage history of an asset, wherein the asset includes a hardware security module with at least a public key and at least a private key.

The computer program product includes a computer readable storage medium having program instructions embodied therewith, the program instructions executable by the computer system to cause the computer system to perform a method. The method includes the hardware security module generating hash values of a pair of a request data and a response data, in which the hash values are signed with the private key and stored in a secure database. A client application logs hash values of the pair of the request data and the response data. Further, the usage history of the asset is proved by verifying the signature of the hash values with the public key and comparing the hash values logged by the client application with the hash values stored in the secure database.

Yet further, a data processing system for execution of a data processing program is provided that includes computer readable program instructions for performing the method described above.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of auditably proving a usage history of an asset, the computer-implemented method comprising:
    logging in a log one set of hash values of a pair of request data and response data, the one set of hash values including hash (request data) and hash (response data); and
    proving the usage history of the asset, the asset comprising a hardware security module having at least a public key and a private key, the proving comprising:
        verifying a signature of an other set of hash values of the pair of request data and response data, the other set of hash values being signed with the private key and retrieved from a secure database, the verifying comprising verifying the signature of the other set of hash values with the public key, wherein the secure database from which the other set of hash values is retrieved is separate from the log containing the one set of hash values of the pair of request data and response data; and
        comparing the one set of hash values that are logged in the log with the other set of hash values retrieved from the secure database.

2. The computer-implemented method of claim 1, further comprising:
    generating the response data, by a hardware security module, based on receiving the request data from a server application;
    generating, by the hardware security module, the other set of hash values of the request data and the response data;
    sending, by the hardware security module, the response data to the server application; and
    signing, by the hardware security module, the other set of hash values with the private key and sending the signed other set of hash values to the secure database.

3. The computer-implemented method of claim 2, further comprising:
    logging, by the client application, the one set of hash values of the request data and the response data received by the server application;
    retrieving the signed other set of hash values from the secure database;
    validating, by the client application, the signature of the other set of hash values using the public key; and
    comparing, by the client application, the hash values logged by the client application with the other hash values retrieved from the secure database.

4. The computer-implemented method of claim 2, wherein the server application is controlled by a client.

5. The computer-implemented method of claim 1, wherein the hardware security module comprises a counter, and wherein the computer-implemented method further comprises:
    incrementing a value of the counter with each new request data;
    combining the incremented value of the counter and the signature with the other set of hash values; and
    verifying gapless request processing of the hardware security module by checking a sequence of the counter values.

6. The computer-implemented method of claim 1, wherein the secure database is implemented on a server, the server being a blockchain server comprising a blockchain ledger.

7. The computer-implemented method of claim 6, wherein the secure database is implemented in the blockchain ledger, and the other set of hash values that are signed are stored in the blockchain ledger.

8. The computer-implemented method of claim 1, wherein the public key is published during an initial setup.

9. The computer-implemented method of claim 1, wherein the logging is performed by a client application.

10. The computer-implemented method of claim 9, wherein the client application comprises a local log file, the local log file being the log storing the one set of hash values received from a server application.

11. The computer-implemented method of claim 9, further comprising:
    using, by the client application, an application programming interface on a server coupled to the client application to retrieve the other set of hash values from the secure database, the secure database stored on the server.

12. The computer-implemented method of claim 1, further comprising adding, by the hardware security module, an execution control to the other set of hash values of the request data and the response data.

13. A computer system for auditably proving a usage history of an asset, the computer system comprising:
    a memory; and
    a processor in communication with the memory, wherein the computer system is configured to perform a method, said method comprising:
        logging in a log one set of hash values of a pair of request data and response data, the one set of hash values including hash (request data) and hash (response data); and proving the usage history of the asset, the asset comprising a hardware security module having at least a public key and a private key, the proving comprising:
verifying a signature of an other set of hash values of the pair of request data and response data, the other set of hash values being signed with the private key and retrieved from a secure database, the verifying comprising verifying the signature of the other set of hash values with the public key, wherein the secure database from which the other set of hash values is retrieved is separate from the log containing the one set of hash values of the pair of request data and response data; and
comparing the one set of hash values that are logged in the log with the other set of hash values stored in retrieved from the secure database.

14. The computer system of claim 13, wherein the method further comprises:
generating the response data, by a hardware security module, based on receiving the request data from a server application;
generating, by the hardware security module, the other set of hash values of the request data and the response data;
sending, by the hardware security module, the response data to the server application; and
signing, by the hardware security module, the other set of hash values with the private key and sending the signed other set of hash values to the secure database.

15. The computer system of claim 14, wherein the method further comprises:
logging, by the client application, the one set of hash values of the request data and the response data received by the server application;
retrieving the signed other set of hash values from the secure database;
validating, by the client application, the signature of the other set of hash values using the public key; and
comparing, by the client application, the hash values logged by the client application with the other hash values retrieved from the secure database.

16. The computer system of claim 13, wherein the hardware security module comprises a counter, and wherein the method further comprises:
incrementing a value of the counter with each new request data;
combining the incremented value of the counter and the signature with the other set of hash values; and
verifying gapless request processing of the hardware security module by checking a sequence of the counter values.

17. A computer program product for auditably proving a usage history of an asset, the computer program product comprising:
a computer readable storage medium readable by a processing circuit and storing instructions for performing a method comprising:
logging in a log one set of hash values of a pair of request data and response data, the one set of hash values including hash (request data) and hash (response data); and
proving the usage history of the asset, the asset comprising a hardware security module having at least a public key and a private key, the proving comprising:
verifying a signature of an other set of hash values of the pair of request data and response data, the other set of hash values being signed with the private key and retrieved from a secure database, the verifying comprising verifying the signature of the other set of hash values with the public key, wherein the secure database from which the other set of hash values is retrieved is separate from the log containing the one set of hash values of the pair of request data and response data; and
comparing the one set of hash values that are logged in the log with the other set of hash values retrieved from the secure database.

18. The computer program product of claim 17, wherein the method further comprises:
generating the response data, by a hardware security module, based on receiving the request data from a server application;
generating, by the hardware security module, the other set of hash values of the request data and the response data;
sending, by the hardware security module, the response data to the server application; and
signing, by the hardware security module, the other set of hash values with the private key and sending the signed other set of hash values to the secure database.

19. The computer program product of claim 18, wherein the method further comprises:
logging, by the client application, the one set of hash values of the request data and the response data received by the server application;
retrieving the signed other set of hash values from the secure database;
validating, by the client application, the signature of the other set of hash values using the public key; and
comparing, by the client application, the hash values logged by the client application with the other hash values retrieved from the secure database.

20. The computer program product of claim 17, wherein the hardware security module comprises a counter, and wherein the method further comprises:
incrementing a value of the counter with each new request data;
combining the incremented value of the counter and the signature with the other set of hash values; and
verifying gapless request processing of the hardware security module by checking.

* * * * *